J. L. DAY.
Shingle-Machines.

No. 150,834. Patented May 12, 1874.

WITNESSES.
P. C. Dieterich.
Fred Riesecker

INVENTOR.
Joseph L. Day,
per J. H. Alexander,
ATTORNEY.

UNITED STATES PATENT OFFICE.

JOSEPH L. DAY, OF MINNEAPOLIS, MINNESOTA, ASSIGNOR TO JAS. J. LINN, OF SAME PLACE.

IMPROVEMENT IN SHINGLE-MACHINES.

Specification forming part of Letters Patent No. 150,834, dated May 12, 1874; application filed April 6, 1874.

*To all whom it may concern:*

Be it known that I, JOSEPH L. DAY, of Minneapolis, in the county of Hennepin and State of Minnesota, have invented certain new and useful Improvements in Shingle-Machines; and I do hereby declare that the following is a full, clear, and exact description thereof, reference being had to the accompanying drawing and to the letters of reference marked thereon, which form a part of this specification.

My invention relates to machines for sawing shingles; and it consists in combining with a horizontally-revolving circular saw a series of horizontally-reciprocating carriages for holding the blocks from which the shingles are sawed, and also in the devices by which said carriages are operated, as will be hereinafter more fully set forth.

In order to enable others skilled in the art to which my invention appertains to make and use the same, I will now proceed to describe its construction and operation, referring to the annexed drawing, in which—

Figure 1:
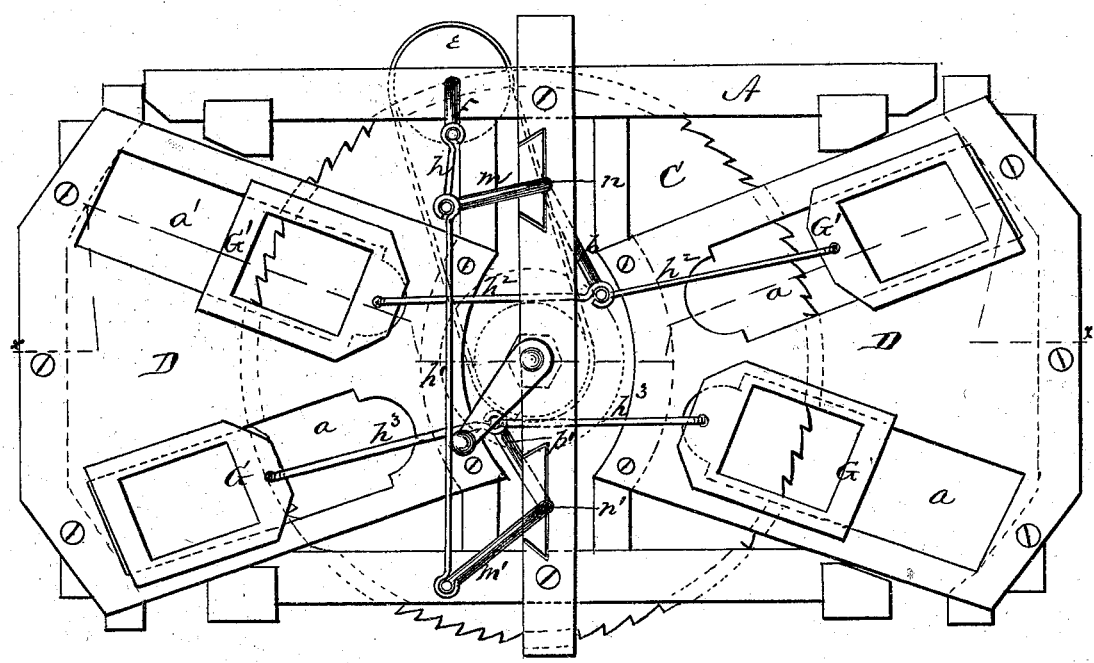
Figure 2:
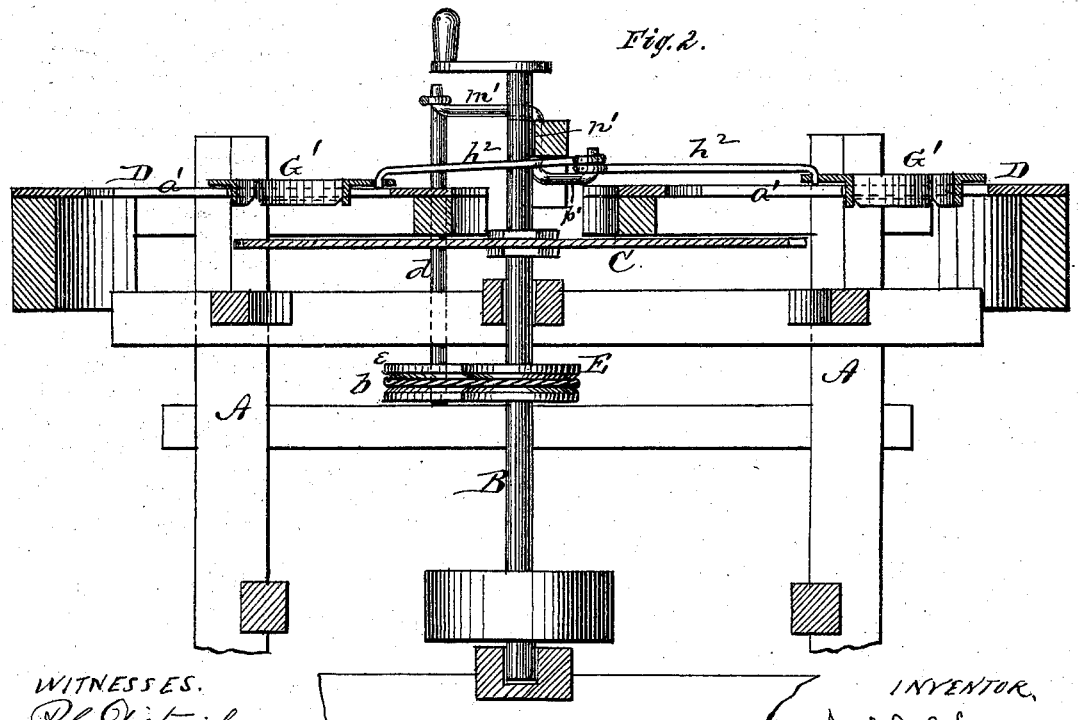

Figure 1 is a plan view of a machine embodying my invention, and Fig. 2 is a vertical section of the same through the line $x\,x$, Fig. 1.

A represents the frame of my machine, and B is the vertical saw-arbor, upon which the circular saw C is secured, so as to revolve horizontally. At each end of the frame A, and above the line of the saw a suitable distance, is a table, D, extending inward nearly to the saw-arbor above the center of the saw. In each table D are two rectangular slots or openings, $a$ and $a'$, running on radial lines from the saw-arbor, and in these openings are placed carriages G and G', respectively, for holding the blocks from which the shingles are to be sawed. This makes four carriages (two on each side) which are to move alternately to and from the saw—that is, while one carriage on each side moves toward the saw the other moves away from it, the sawing being done in all cases while moving toward the saw. On the saw-arbor B is a pulley, E, connected by a belt, $b$, with a pulley, $e$, on a vertical shaft, $d$, on one side of the frame A. At the upper end of this shaft is a crank, $f$, connected by a rod, $h$, with a crank, $m$, on the upper end of a short shaft, $n$, which passes vertically through a cross-beam at the top of the frame. The crank $m$ is, by a rod, $h^1$, connected with a similar crank, $m'$, on the upper end of another vertical shaft, $n'$, also passing through said cross-bar. The lower ends of the shafts $n\,n'$ are provided with cranks $p\,p'$, respectively, as shown in the drawing. The crank $p$ is, by rods $h^2\,h^2$, connected with the carriages G G, and the crank $p'$, by rods $h^3\,h^3$, connected with the carriages G' G'. By the revolution of the saw-arbor the vertical shaft $d$ is also revolved, and by the various cranks and connecting-rods, as described, the carriages obtain the required alternate reciprocating motion.

The same machine may be used for sawing laths by simply removing the single-carriages and substituting suitable lath-carriages.

Having thus fully described my invention, what I claim as new, and desire to secure by Letters Patent, is—

The combination, with the carriages G G', and the shaft $d$ obtaining its motion from the saw-arbor, of the crank $f$, shafts $n\,n'$, with cranks $m\,p$ and $m'\,p'$, respectively, and the connecting-rods $h$, $h^1$, $h^2$, and $h^3$, all substantially as and for the purposes herein set forth.

In testimony that I claim the foregoing as my own I affix my signature in presence of two witnesses.

JOSEPH L. DAY.

Witnesses:
  E. D. B. PORTER,
  C. E. ROGERS.